(12) United States Patent
Mock et al.

(10) Patent No.: US 6,820,217 B2
(45) Date of Patent: Nov. 16, 2004

(54) METHOD AND APPARATUS FOR DATA RECOVERY OPTIMIZATION IN A LOGICALLY PARTITIONED COMPUTER SYSTEM

(75) Inventors: Matthew Mark Mock, Rochester, MN (US); David Finian Owen, Rochester, MN (US); Gary Ross Ricard, Chatfield, MN (US)

(73) Assignee: International Business Machines Corporation, Armonk, NY (US)

( * ) Notice: Subject to any disclaimer, the term of this patent is extended or adjusted under 35 U.S.C. 154(b) by 593 days.

(21) Appl. No.: 10/074,889

(22) Filed: Oct. 29, 2001

(65) Prior Publication Data
US 2003/0084372 A1 May 1, 2003

(51) Int. Cl.[7] ............................................. G06F 11/00
(52) U.S. Cl. ................................. 714/15; 707/202
(58) Field of Search ............................. 714/6, 15, 20; 707/202

(56) References Cited

U.S. PATENT DOCUMENTS

| | | | | |
|---|---|---|---|---|
| 4,819,156 A | * | 4/1989 | DeLorme et al. ............. | 714/15 |
| 4,843,541 A | * | 6/1989 | Bean et al. ................... | 710/36 |
| 5,574,897 A | | 11/1996 | Hermsmeier et al. ........ | 395/600 |
| 5,596,747 A | * | 1/1997 | Katabami et al. ............ | 707/101 |
| 5,625,820 A | | 4/1997 | Hermsmeier et al. ........ | 395/618 |
| 5,727,203 A | * | 3/1998 | Hapner et al. .......... | 707/103 R |
| 5,966,713 A | * | 10/1999 | Carlsund et al. ............. | 707/200 |
| 6,249,792 B1 | * | 6/2001 | Zwilling et al. ............. | 707/205 |
| 6,289,355 B1 | * | 9/2001 | Haderle et al. .............. | 707/200 |

* cited by examiner

*Primary Examiner*—Robert Beausoliel
*Assistant Examiner*—Gabriel L Chu
(74) *Attorney, Agent, or Firm*—Roy W. Truelson (57) ABSTRACT

A protection utility for compiled data in a computer system having dynamically configurable logical partitions determines the time for rebuilding compiled data, and selectively stores data in a form not requiring rebuild to meet a pre-specified recovery time limit. If the configuration changes, the protection strategy is automatically migrated to adapt to the new configuration. Preferably, the compiled data is multiple database indexes, which are selectively logged to reduce recovery time. Logging is selectively discontinued or extended responsive to changes in partition configuration, allowing a gradual migration to the target recovery time using the new set of configured resources.

17 Claims, 8 Drawing Sheets

METHOD AND APPARATUS FOR DATA RECOVERY OPTIMIZATION IN A LOGICALLY PARTITIONED COMPUTER SYSTEM

FIELD OF THE INVENTION

The present invention relates generally to digital data processing, and more particularly to the recovery of certain data in a digital computer system.

BACKGROUND OF THE INVENTION

A modern computer system typically comprises a central processing unit (CPU) and supporting hardware necessary to store, retrieve and transfer information, such as communications busses and memory. It also includes hardware necessary to communicate with the outside world, such as input/output controllers or storage controllers, and devices attached thereto such as keyboards, monitors, tape drives, disk drives, communication lines coupled to a network, etc. The CPU is the heart of the system. It executes the instructions which comprise a computer program and directs the operation of the other system components.

From the standpoint of the computer's hardware, most systems operate in fundamentally the same manner. Processors are capable of performing a limited set of very simple operations, such as arithmetic, logical comparisons, and movement of data from one location to another. But each operation is performed very quickly. Programs which direct a computer to perform massive numbers of these simple operations give the illusion that the computer is doing something sophisticated. What is perceived by the user as a new or improved capability of a computer system is made possible by performing essentially the same set of very simple operations, but doing it much faster. Therefore continuing improvements to computer systems require that these systems be made ever faster.

The overall speed of a computer system (also called the "throughput") maybe crudely measured as the number of operations performed per unit of time. Many improvements have been made and continue to be made to increase the speed of individual computer processors. However, there are certain limits to processor clock speed, number of circuits on a chip, and so forth which limit the overall throughput of a single processor. To support increasing demand for computing resource, it has become common in many large systems to employ multiple processors as a means of further increasing the throughput of the system. Additionally, such large systems may have multiple caches, buses, I/O drivers, storage devices and so forth.

The proliferation of system components introduces various architectural issues involved in managing these resources. For example, multiple processors typically share the same main memory (although each processor may have its own cache). If two processors have the capability to concurrently read and update the same data, there must be mechanisms to assure that each processor has authority to access the data, and that the resulting data is not gibberish. Another architectural issue is the allocation of processing resources to different tasks in an efficient and "fair" manner, i.e., one which allows all tasks to obtain reasonable access to system resources. There are further architectural issues, which need not be enumerated in great detail here.

One recent development in response to this increased system complexity is to support logical partitioning of the various resources of a large computer system. Conceptually, logical partitioning means that multiple discrete partitions are established, and the system resources of certain types are assigned to respective partitions. Specifically, processor resources of a multi-processor system may be partitioned by assigning different processors to different partitions, by sharing processors among some partitions and not others, by specifying the amount of processing resource measure available to each partition which is sharing a set of processors, and so forth. Each task executes within a logical partition, meaning that it can use only the resources assigned to that partition, and not resources assigned to other partitions.

Logical partitions are generally defined and allocated by a system administrator or user with similar authority. I.e., the allocation is performed by issuing commands to appropriate management software resident on the system, rather than by physical reconfiguration of hardware components. It is expected, and indeed one of the benefits of logical partitioning is, that the authorized user can re-allocate system resources in response to changing needs or improved understanding of system performance. Some logical partitioning systems support dynamic partitioning, i.e., the changing of certain resource definition parameters while the system is operational, without the need to shut down the system and re-initialize it.

One of the design goals of many large modern computer systems is availability. It is desirable that these systems be available to users as much as possible. In some cases, there is a need for constant availability, i.e., the system must be designed so that it is always available, come what may. In other systems, some amount of down time, or some amount of time when the system operates at reduces performance, may be acceptable.

In general, there is some trade-off between availability and maximum utilization of hardware resources for productive work. For example, it is well known to store data in a redundant fashion on multiple storage devices in any of various schemes known as "RAID", meaning "redundant array of independent disks". However, all of these schemes sacrifice some of the storage capacity of the disks in order to achieve redundancy. Additionally, these schemes may adversely affect storage access times when compared with non-redundant storage schemes.

Among system availability tools are certain functions which handle the recovery of compiled data. As used herein, compiled data is any data which is derived or derivable from other data stored in the system. Basic non-compiled, or raw, data, is not necessarily recoverable by any deterministic system process if the data becomes lost due to system failure or other reason. Unlike this raw data, compiled data, if lost, can always be recovered by deriving it again from the raw data on which it was based. However, re-deriving the compiled data may take a very long time, during which the compiled data may be unavailable or the performance of the system adversely affected.

One common type of compiled data is a database index. Large computer systems often support very large databases. Information may be selectively extracted from such databases by means of various database queries. Since these queries can consume significant processor resources, indexes of data are established to support queries of specific fields in the database. An index is typically associated with a specific field in the database records, and orders the records in the database according to the value in that field. For example, the index may be an ordered list of pointers to database records, where the pointers are ordered according to a field value. Alternatively, the index may be an ordered list of value and pointer pairs, where the value is the value in the associated field, and the pointer a pointer to the database record, the ordered list being sorted according to field value.

The time required to regenerate compiled data can be shortened or eliminated if the compiled data is saved in certain recovery assistant forms as changes are made. However, such techniques generally have associated costs in terms of additional hardware and/or system performance degradation. As an extreme example, compiled data can be saved to storage in the same manner as raw data, so that it is simply read from storage or otherwise recovered in the same manner as raw data, without lengthy regeneration. This naturally increases the number of I/O operations. A less intrusive technique is logging or journalling in some fashion as changes are made to the raw data which affect the compiled data. Depending on the number of objects logged, the frequency of logging, and so forth, a longer or shorter recovery time may be experienced following a failure, the less intensive logging techniques typically requiring a longer recovery period following failure. Thus, in general it may be said that there is a design trade-off for a given system between maximum performance during normal operations and time to recover compiled data in the event of a failure.

One existing data protection utility which supports the maintenance of compiled data for regeneration, and specifically supports the maintenance of database indexes for regeneration, in the event such data is lost due to some event, such as a power failure, is disclosed in U.S. Pat. No. 5,574,897 to Hermsmeier et al. and U.S. Pat. No. 5,625,820 to Hermsmeier et al. A system may selectively log certain database indexes, in accordance with a user specified recovery time. If the user specifies that the system must respond with a relatively short recovery time, more intensive logging is generally required; if the user specifies that the system can tolerate a relatively longer recovery time, the system can reduce the logging activity.

Where a system is logically partitioned, a data protection utility executes in one of the logical partitions. In the case of dynamically defined logical partitions, it is possible that the parameters of the logical partition in which the data protection utility executes will change. The utility may therefore over-estimate or under-estimate the recovery time required in a dynamically logically partitioned environment. In the case of an over-estimate, the utility may perform excessive or unnecessary redundancy functions during normal system operation, resulting in a decline in system performance. In the case of an under-estimate, the utility may fail to recover in time following a failure. A need therefore exists, not necessarily recognized, to assure that recovery strategies accurately reflect the current system configuration under which they are to be executed.

SUMMARY OF THE INVENTION

A protection utility for compiled data in a computer system having dynamically configurable logical partitions determines the time for rebuilding compiled data, and selectively stores data in a form not requiring rebuild in order to meet a pre-specified recovery time limit. If the configuration changes, the protection strategy is migrated to adapt to the new configuration.

In the preferred embodiment, the compiled data is multiple database indexes for one or more potentially large databases. The user specifies a maximum recovery time for the database indexes. The protection utility automatically calculates the recovery time for each index, using the current configuration of the logical partition in which the protection utility executes. If the total recovery time is more than the specified maximum, at least some of the indexes are logged to reduce the recovery time. If the configuration of the logical partition is changed so that partition resources are reduced, requiring a longer recovery time, the protection utility determines the new recovery time, and begins to log additional indexes as changes are made to migrate the recovery time below the specified maximum. If the configuration of the logical partition is changed so that partition resources are increased, requiring a shorter recovery time, the protection utility selects indexes for discontinued logging, so that recovery time migrates upward toward the limit.

In the preferred embodiment, the system is configured as a plurality of logical partitions, each partition having an assigned set of physical processors (which may be shared with one or more other partitions), an assigned processor resource measure (i.e., a processor resource measure in units of equivalent physical processors) and an assigned number of virtual processors. In a rough sense, each partition behaves as if it contains as many processors as the assigned number of virtual processors, each such processor having an appropriate fraction of the processing capacity of a physical processor. The set of physical processors, the processor resource measure, and the number of virtual processors assigned to a logical partition may be dynamically altered during system operation. The processor resource measure is the primary indicator of recovery time used by the recovery tool.

By migrating the recovery times to the specified target times in an environment in which the system may be dynamically changing, the system avoids unnecessary I/O operations relating to recovery, and avoids excessive recovery times.

The details of the present invention, both as to its structure and operation, can best be understood in reference to the accompanying drawings, in which like reference numerals refer to like parts, and in which:

DETAILED DESCRIPTION OF THE PREFERRED EMBODIMENTS

Logical Partitioning Overview

Logical partitioning is a technique for dividing a single large computer system into multiple partitions, each of which behaves in some respects as a separate computer system. Certain resources of the system may be allocated into discrete sets, such that there is no sharing of a single resource among different partitions, while other resources may be shared on a time interleaved or other basis. Examples of resources which may be partitioned are central processors, main memory, I/O processors and adapters, and I/O devices. Each user task executing in a logically partitioned computer system is assigned to one of the logical partitions ("executes in the partition"), meaning that it can use only the system resources assigned to that partition, and not resources assigned to other partitions.

Logical partitioning is indeed logical rather than physical. A general purpose computer typically has physical data connections such as buses running between a resource in one partition and one in a different partition, and from a physical configuration standpoint, there is typically no distinction made with regard to logical partitions. Generally, logical partitioning is enforced by low-level encoded data, which is referred to as "licensed internal code", although there may be a certain amount of hardware support for logical partitioning, such as hardware registers which hold state information. E.g., from a hardware standpoint, there is nothing which prevents a task executing in partition A from writing to an I/O device in partition B. Low level licensed internal code function and/or hardware prevent access to the resources in other partitions.

Code enforcement of logical partitioning constraints means that it is possible to alter the logical configuration of a logically partitioned computer system, i.e., to change the number of logical partitions or re-assign resources to different partitions, without reconfiguring hardware. Generally, a logical partition management tool is provided for this purpose. This management tool is intended for use by a single or a small group of authorized users, who are herein designated the system administrator. In the preferred embodiment described herein, this management tool is referred to as the "hypervisor". A portion of this management tool used for creating or altering a configuration executes in one of the logical partitions, herein designated the "primary partition".

Logical partitioning of a large computer system has several potential advantages. As noted above, it is flexible in that reconfiguration and re-allocation of resources is easily accomplished without changing hardware. It isolates tasks or groups of tasks, helping to prevent any one task or group of tasks from monopolizing system resources. It facilitates the regulation of resources provided to particular users; this is important where the computer system is owned by a service provider which provides computer service to different users on a fee-per-resource-used basis. Finally, it makes it possible for a single computer system to concurrently support multiple operating systems, since each logical partition can be executing in a different operating system.

Additional background information regarding logical partitioning can be found in the following commonly owned patents and patent applications, which are herein incorporated by reference: Ser. No. 09/838,057, filed Apr. 19, 2001, entitled Method and Apparatus for Allocating Processor Resources in a Logically Partitioned Computer System; Ser. No. 09/836,687, filed Apr. 17, 2001, entitled A Method for Processing PCI Interrupt Signals in a Logically Partitioned Guest Operating System; Ser. No. 09/836,692, filed Apr. 17, 2001, entitled A Method for PCI Bus Detection in a Logically Partitioned System; Ser. No. 09/836,139, filed Apr. 17, 2001, entitled Method for PCI I/O Using PCI Device Memory Mapping in a Logically Partitioned System; Ser. No. 09/672,043, filed Sep. 29, 2000, entitled Technique for Configuring Processors in System With Logical Partitions; Ser. No. 09/346,206, filed Jul. 1, 1999, entitled Apparatus for Supporting a Logically Partitioned Computer System; Ser. No. 09/314,769, filed May 19, 1999, entitled Processor Reset Generated Via Memory Access Interrupt; Ser. No. 09/314,541, filed May 19, 1999, entitled Apparatus and Method for Specifying Maximum Interactive Performance in a Logical Partition of a Computer; Ser. No. 09/314,324, filed May 19, 1999, entitled Management of a Concurrent Use License in a Logically Partitioned Computer; Ser. No. 09/314,214, filed May 19, 1999, entitled Logical Partition Manager and Method; Ser. No. 09/314,187, filed May 19, 1999, entitled Event-Driven Communications Interface for Logically Partitioned Computer; U.S. Pat. No. 5,659,786 to George et al.; and U.S. Pat. No. 4,843,541 to Bean et al. The latter two patents describe implementations using the IBM S/360, S/370, S/390 and related architectures, while the remaining applications describe implementations using the IBM AS/400 and related architectures.

Detailed Description

Figure 1:
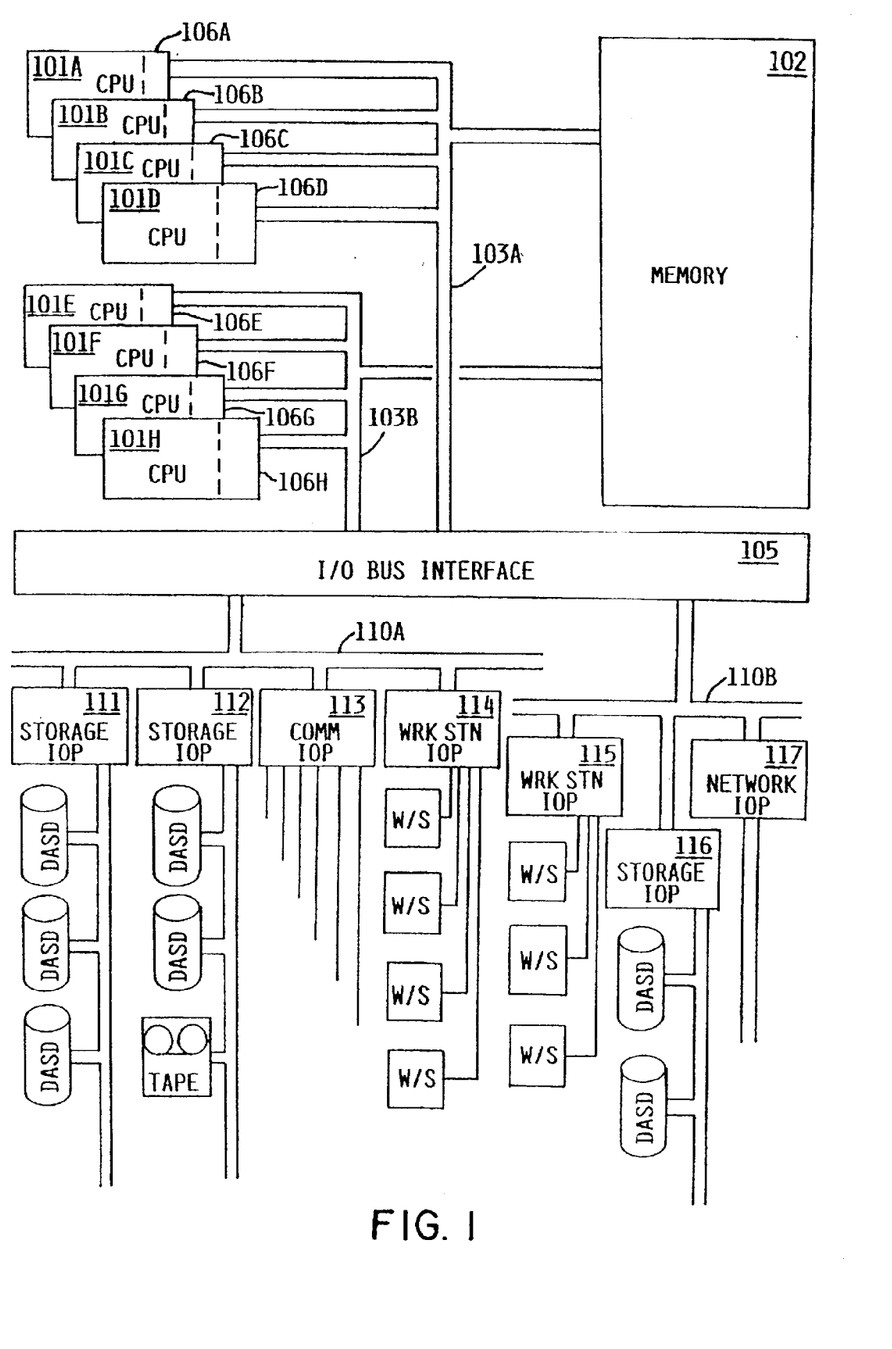
FIG. 1 is a high-level block diagram of the major hardware components of a logically partitioned computer system having multiple CPUs, according to the preferred embodiment of the invention described herein.

The major hardware components of a multiprocessor computer system 100 for utilizing a compiled data recovery strategy according to the preferred embodiment of the present invention are shown in FIG. 1. Multiple central processing units (CPUs) 101A–101H concurrently perform basic machine processing function on instructions and data from main memory 102. Each processor preferably contains or controls a respective cache. These cache structures are shown conceptually in FIG. 1 as a single block 106A–106H for each respective processor; however, it should be understood that a processor's cache may include multiple separate structures at multiple levels, such as an on-chip L1 instruction cache, an on-chip L1 data cache, an on-chip L2 cache directory/controller, and an L2 cache memory on a separate chip. For purposes of this invention, the precise implementation details of caching in each processor are not significant, and the caches could be implemented differently or the invention could be implemented without caches associated with the processors.

A pair of memory buses 103A, 103B connect the various CPUs, main memory, and I/O bus interface unit 105. I/O bus interface unit 105 communicates with multiple I/O processing units (IOPs) 111–117 through respective system I/O buses 110A, 110B. In the preferred embodiment, each system I/O bus is an industry standard PCI bus. The IOPs support communication with a variety of storage and I/O devices, such as direct access storage devices (DASD), tape drives, workstations, printers, and remote communications lines for communication with remote devices or other computer systems. While eight CPUs, two memory buses, two I/O buses, and various numbers of IOPs and other devices are shown in FIG. 1, it should be understood that FIG. 1 is intended only as an illustration of the possible types of devices that may be supported, and the actual number and configuration of CPUs, buses, and various other units may vary. It should also be understood that the buses are illustrated in a simplified form as providing communications paths between various devices, and in fact the actual bus structure may be more complex, and contain additional hierarchies or components not shown. For simplicity, CPUs, memory buses and I/O buses are herein designated generically by reference numbers 101, 103 and 110, respectively.

While various system components have been described and shown at a high level, it should be understood that a typical computer system contains many other components not shown, which are not essential to an understanding of the present invention. In the preferred embodiment, computer system 100 is a multiprocessor computer system based on the IBM AS/400 or I/Series architecture, it being understood that the present invention could be implemented on other multiprocessor computer systems.

Figure 2:
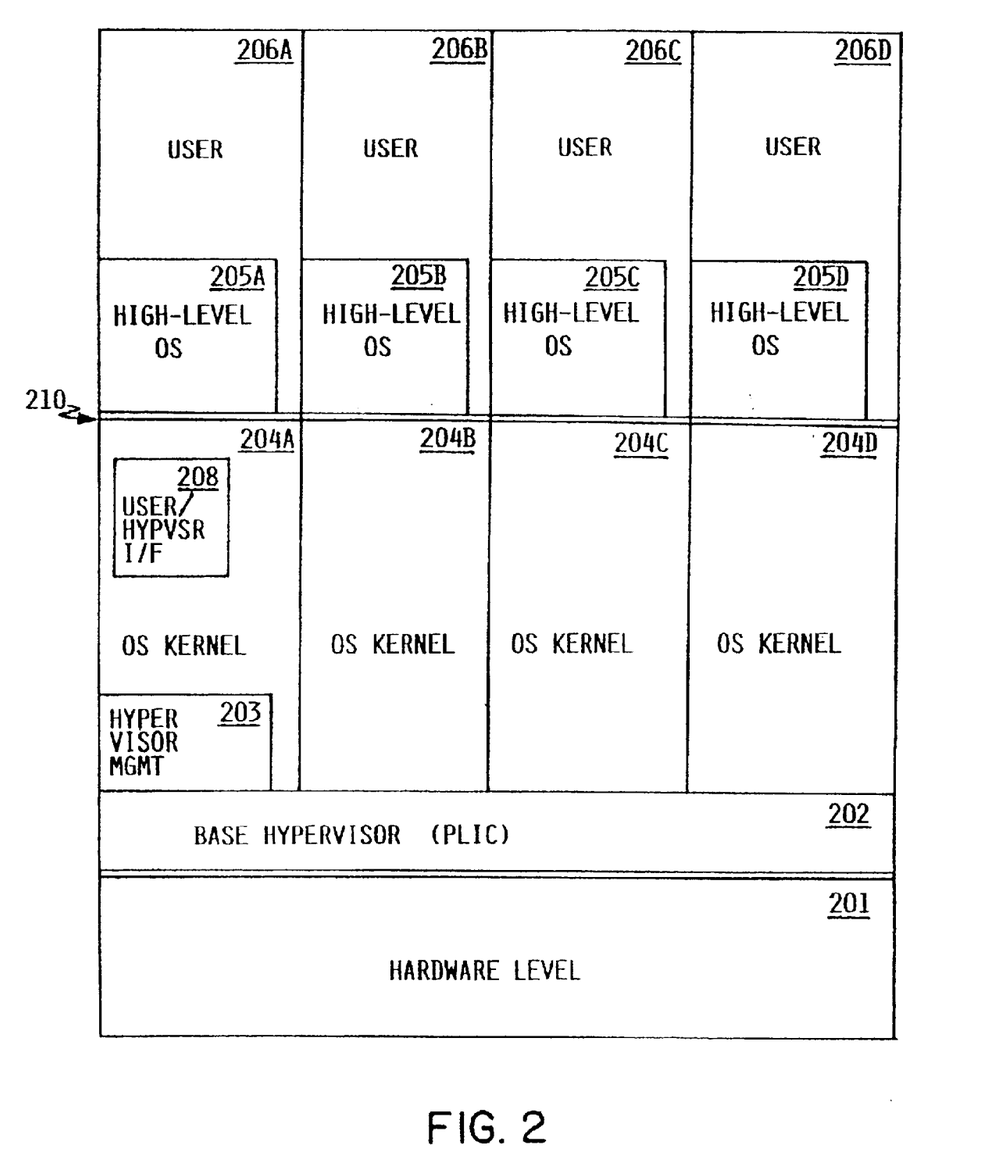
FIG. 2 is a conceptual illustration showing the existence of logical partitions at different hardware and software levels of abstraction in a computer system, according to the preferred embodiment.

FIG. 2 is a conceptual illustration showing the existence of logical partitions at different hardware and software levels of abstraction in computer system 100. FIG. 2 represents a system having four logical partitions, it being understood that the number of partitions may vary. As is well known, a computer system is a sequential state machine which performs processes. These processes can be represented at varying levels of abstraction. At a high level of abstraction, a user specifies a process and input, and receives an output. As one progresses to lower levels, one finds that these processes are sequences of instructions in some programming language, which continuing lower are translated into lower level instruction sequences, and pass through licensed internal code and ultimately to data bits which get put in machine registers to force certain actions. At a very low level, changing electrical potentials cause various transistors to turn on and off. In FIG. 2, the "higher" levels of abstraction are represented toward the top of the figure, while lower levels are represented toward the bottom.

As shown in FIG. 2 and explained earlier, logical partitioning is a code-enforced concept. At the hardware level 201, logical partitioning does not exist. As used herein, hardware level 201 represents the collection of physical devices (as opposed to data stored in devices), such as processors, memory, buses, I/O devices, etc., shown in FIG. 1, including other hardware not shown in FIG. 1. As far as a processor 101 is concerned, it is merely executing machine language instructions. In the preferred embodiment, each processor is identical and more or less interchangeable. While code can direct tasks in certain partitions to execute on certain processors, there is nothing in the processor itself which dictates this assignment, and in fact the assignment can be changed by the code. Therefore the hardware level is represented in FIG. 2 as a single entity 201, which does not distinguish between logical partitions.

Immediately above the hardware is a common low-level hypervisor base 202, also called partitioning licensed internal code (PLIC), which enforces logical partitioning. As represented in FIG. 2, there is no direct path between higher levels (levels above hypervisor 202) and hardware level 201, meaning that commands or instructions generated at higher levels must pass through hypervisor 202 before execution on the hardware. Hypervisor 202 enforces logical partitioning of processor resources by presenting a partitioned view of hardware to the task dispatchers at higher levels. I.e., task dispatchers at a higher level (the OS kernel) dispatch tasks to virtual processors defined by the logical partitioning parameters, and the hypervisor in turn dispatches virtual processors to physical processors at the hardware level 201 for execution of the underlying task. The hypervisor also enforces partitioning of other resources, such as allocations of memory to partitions, and routing I/O to I/O devices associated with the proper partition. Hypervisor 202 contains state data, some of which may be stored in special purpose registers while other such state data is stored in tables or other structures. Essentially, this state data defines the allocation of resources in logical partitions, and the allocation is altered by changing the state data rather than by physical reconfiguration of hardware.

Above hypervisor 202 is another level of machine management code herein identified as the "OS kernel" 204A–204D. At the level of the OS kernel, each partition behaves differently, and therefore FIG. 2 represents the OS Kernel as four different entities 204A–204D corresponding to the four different partitions. In general, each OS kernel 204A–204D performs roughly equivalent functions, and the OS kernel is herein generically referred to as feature 204. However, it is not necessarily true that all OS kernel 204A–204D are identical copies of licensed internal code, and they could be different versions of architecturally equivalent licensed internal code, or could even be architecturally different licensed internal code modules. OS kernel 204 performs a variety of task management functions, and in particular, enforces data integrity and security among multiple tasks.

Above the OS kernel are a set of high-level operating system functions 205A–205D, and user application code and data 206A–206D. A user may create code in levels 206A–206D which invokes one of high level operating system functions 205A–205D to access the OS kernel, or may directly access the OS kernel. This is represented in FIG. 2 by showing that both high level operating system functions 205A–205D and user application levels 206A–206D reach the OS kernel boundary. In the AS/400 architecture, a user-accessible architecturally fixed "machine interface" 210 forms the upper boundary of the OS kernel, (the OS kernel being referred to as "SLIC"), but it should be understood that different operating system architectures may define this interface differently, and that it would be possible to operate different operating systems on a common hardware platform using logical partitioning.

One and only one of the logical partitions is designated the primary partition, which is the partition used by the system administrator to manage logical partitioning. The primary partition contains a special portion of hypervisor code 203 which shares the level of OS kernel 204A. Hypervisor portion 203 contains code necessary to create or alter logical partition definitions. Collectively, hypervisor portion 203 and hypervisor base 202 constitute the hypervisor. Additionally, a user-to-hypervisor interface 208 is provided at the OS kernel level in the primary partition. Interface 208 provides functions for interacting with a user (system administrator) to obtain user-specified partitioning parameters. The functions available in interface 208 may be used directly in a direct-attach terminal, or may be accessed through a set of APIs from other interface code (not shown) in any device (such as an intelligent workstation) connected to computer system 100. The hypervisor is super-privileged code which is capable of accessing resources, and specifically processor resources, in any partition. The hypervisor causes state values to be written to various hardware registers and other structures, which define the boundaries and behavior of the logical partitions.

In accordance with the preferred embodiment, the administrator defines multiple logical partitions and the resources available to each. The regeneration of compiled data is a very processor-intensive operation, and the time required to regenerate compiled data is therefore closely related to the processor resources available. With respect to processing resource, the administrator specifies four things: the number of virtual processors available to each partition, the processing capacity available to the partition, whether the assigned processing capacity is capped, and the assignment of physical processors to partitions. The processor parameters are explained with reference to the examples below. Any or all of these parameters may be dynamically changed by the administrator, effecting an altered configuration. By "dynamically changed" it is meant that the administrator may alter certain parameters which define a logical partition while the computer system is operating, without the need to shut down the system and re-initialize it. It is not necessarily the case that all parameters which define logical partitions may be altered dynamically, but in the preferred embodiment, the processor parameters described herein can be dynamically altered. One consequence of the capability to dynamically change the logical partition defining parameters is that a job or process may commence execution in a logical partition P having defined parameters $p_1, p_2, p_3 \ldots$, and while the job or process is executing these parameters may change to $p_1', p_2', p_3' \ldots$, so that the job or process continues executing in partition P, having different characteristics.

Figure 3:
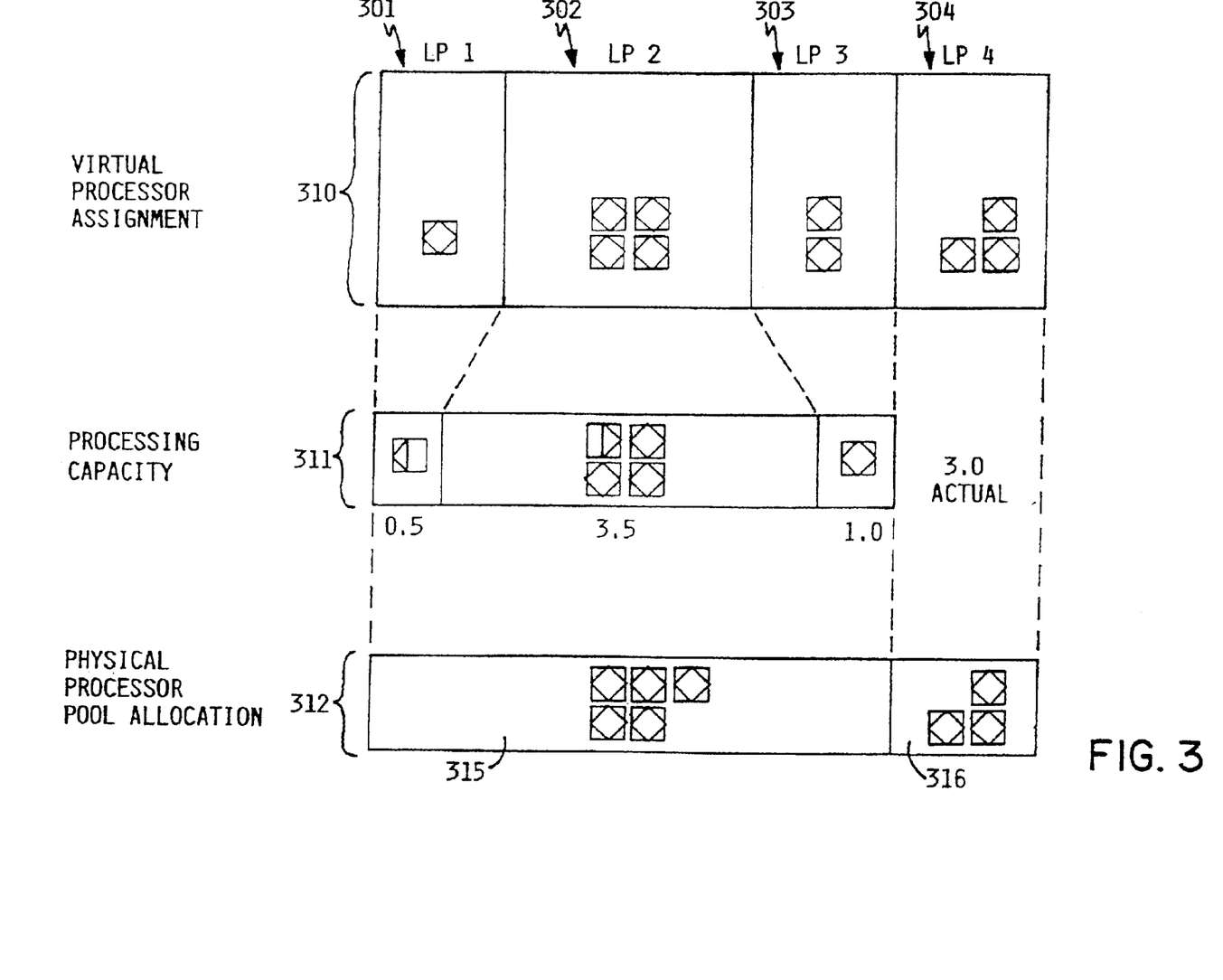
FIG. 3 shows an example logical partitioning processor allocation for a system having eight physical processors, according to the preferred embodiment.

FIG. 3 shows an example logical partitioning processor allocation for a system having eight physical processors. As shown in FIG. 3, four logical partitions 301–304 are defined. For each logical partition, there exists a respective virtual processor assignment 310, and a processing capacity allocation 311. Additionally, there exists an allocation 312 for physical processors. In the example of FIG. 3, logical partition 301 is assigned one virtual processor and 0.5 processing unit of processing capacity; logical partition 302 is assigned four virtual processors and 3.5 processing units of processing capacity; and partition 303 is assigned two virtual processors and 1.0 unit of processing capacity. Partition 304 is assigned three dedicated processors (an actual processing capacity of 3.0 units). Virtual processors are always assigned in integer numbers. Processing capacity is not necessarily an integer.

In the example of FIG. 3, two sets of processors 315, 316 are defined. Set 315, which is a "pool", contains five physical processors, while set 316 contains three. Logical partitions 301–303 execute in pool 315, while partition 304 executes in set 316.

A physical processor allocation constrains a task executing in an associated partition to run on only the processors allocated to the processor set to which the partition is assigned. In this embodiment, a set of one or more processors may be assigned to a partition in dedicated mode, or may be assigned to a processor pool, to which one or more partitions are in turn assigned. Dedicated mode means simply that the full capacity of the set of physical processors is dedicated to a single partition. In a pooled mode, the processors are assigned to a pool, which is typically (although not necessarily) shared among more than one partition. Dedicated mode is functionally equivalent to a pool to which only one logical partition is assigned, and in which the full capacity and number of virtual processors of the pool are given to the one partition.

Thus, in the example of FIG. 3, set 315 is shared among multiple partitions and is a processor pool, while set 316 is a set of processors dedicated to partition 304. A task executing in partition 301 can be dispatched to any of the five physical processors allocated to pool 315, but can not be dispatched to any of the three physical processors allocated to set 316, even if those processors are idle. Since pool 315 is shared among partitions 301–303, the tasks executing in these partitions share the five processors assigned to pool 315.

The processing capacity allocation specifies the amount of equivalent processing power allocated to a partition in processor units. I.e., one processor unit is the equivalent of a single physical processor executing 100% of the time. The sum of the processing capacity allocations of all partitions assigned to a particular processor pool can not exceed the number of physical processors in the pool, although it may be less than the number of physical processors in the pool (in which case, there is unallocated processor capacity).

In the example of FIG. 3, logical partition 301 is allocated 0.5 units of processing capacity, which means it is allocated a capacity equivalent to one physical processor executing 50% of the time (or running at 50% of normal speed). However, this does not mean that one of the processors in pool 315 will execute roughly half time on behalf of tasks in partition 301. Work from any one partition assigned to a pool is distributed among the processors in the pool, and it can be expected that on the average each of the five processors in pool 315 will devote about 10% of its capacity to executing on behalf of tasks from partition 301. The user specifies a processing capacity allocation only for partitions assigned to pools; partitions having dedicated processors automatically receive the full capacity of the dedicated processors. FIG. 3 therefore shows a processing capacity of 3.0 for partition 304, this being an equivalent number, although in fact the user does not specify a processing capacity.

The virtual processor assignment specifies the number of virtual processors seen by each respective partition which is assigned to a pool of processors. To the partition, the underlying hardware and dispatching code behaves like the number of virtual processors specified, each of which is running at some fraction of the power of a single physical processor, the fraction being the number of virtual processors divided by the number processing units allocated to the partition. Thus, in the example of FIG. 3, partition 302 sees four virtual processors, each operating at approximately 82.5% (3.5/4) of the capacity of a single physical processor. Partition 303 sees two virtual processors, each operating at 50% of the capacity of a single physical processor. Like processing capacity, the user specifies a virtual processor allocation only for partitions assigned to pools; partitions having dedicated processors automatically receive a number of virtual processors equal to physical processors. FIG. 3 therefore shows three virtual processors for partition 304.

A logical partition assigned to a pool may be designated either capped or uncapped. A capped partition can not use more processing capacity than its allocation, even if processors are idle due to lack of available work from other partitions in the same pool. Capping assures that a particular logical partition will not exceed its allocated usage, which is desirable in some circumstances. An uncapped partition may utilize spare processing capability beyond its allocation, provided that it may not execute its tasks on physical processors outside its assigned processor pool. Capping does not apply to partitions having dedicated processors.

The configuration of FIG. 3 is merely a single example configuration, and many variations are possible. The number of processor sets may vary. Since sets of processors are disjoint and each set must have at least one physical processor, the number of such sets is necessarily limited by the number of physical processors in the system. But in other respects, the administrator is free to allocate sets as he wishes, and may allocate zero, one or multiple sets which are pools, and zero, one or multiple sets which are dedicated to a single respective logical partition. Additionally, while a processor pool is usually used for sharing among multiple partitions, a processor pool could have only a single partition assigned to it. For example, if for some reason it is desired to limit the processor resources allocated to a single logical partition, a pool containing a single processor could be defined, to which a single logical partition is assigned, the partition being given a processing capacity of 0.5 processors and specified as capped. It should further be understood that the set of processor parameters described above which are associated with logical partitions are simply one implementation of the general concept of logical partitioning, and that different parameters could be used to define the characteristics of each logical partition.

Figure 4:
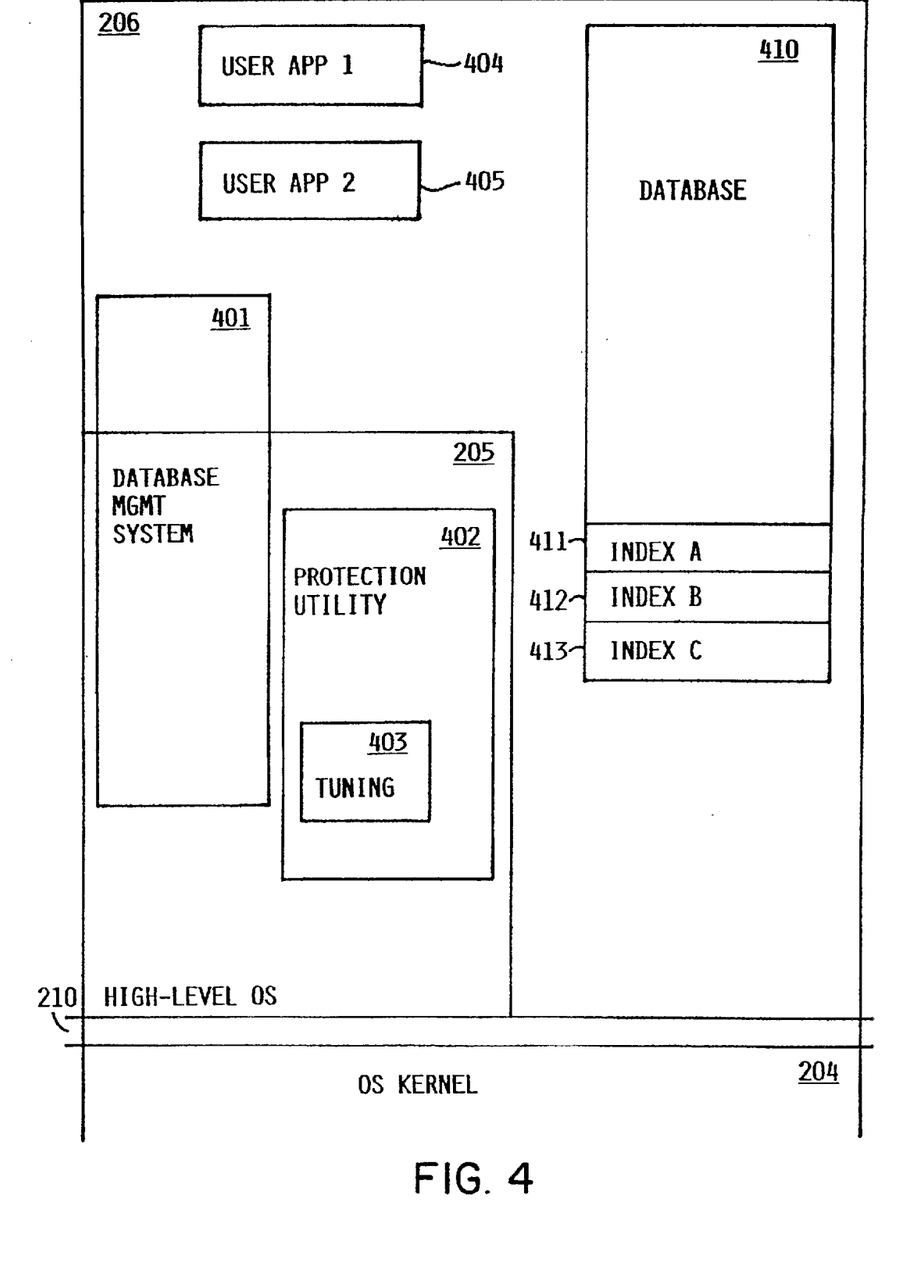
FIG. 4 illustrates at a high level various user applications and data in a logical partition of a computer system, according to the preferred embodiment.

Each user job or process is assigned to a respective logical partition. Typically, a single logical partition will contain many user applications (although some partitions may be dedicated to special purposes). FIG. 4 illustrates at a high level various user applications and data in a logical partition of computer system 100.

As shown in FIG. 4, at a level above machine interface 210 in a logical partition P, there exists high level operating system functions 205 and user applications and data 206. Database management system 401 provides basic functions for the management of user databases. Database management system 401 may theoretically support an arbitrary number of databases, although only one is shown in FIG. 4. Database management system 401 preferably allows users to perform basic database operations, such as defining a database, altering the definition of the database, creating, editing and removing records in the database, viewing records in the database, and so forth. It may further contain any of various more advanced database functions. In particular, in the preferred embodiment, database management system 401 allows a user to define multiple database indexes for accessing data in the database. Database management system 401 may be contained entirely within high-level operating system 205, or may be separate from high-level OS 205, or portions of it may be within high-level OS 205 while other portions are separate. In addition to database management system 401, other user applications 404–405 may execute in partition P. Such other user applications may include, e.g., word processing, accounting, code development and compilation, mail, calendaring, or any of thousands of user applications. Some of these applications may access data in database 410, while others may not.

Database 410 contains a plurality of records, each record containing at least one (and usually many) fields, as is well known in the art. Associated with database 410 are multiple database indexes 411–413. Although one database and three indexes are shown in FIG. 4 for illustrative purposes, it being understood that the actual number of such entities, and particularly, the number of indexes associated with a single database, is typically much larger. Database 410 and database indexes 411–413 are illustrated in FIG. 4 as conceptual entities because various applications at user application level 206 may access them. However, it will be understood that database 410 and indexes 411–413 themselves are not executable code. Database 410 and indexes 411–413 may be extremely large, and could include data on other systems which is accessed through remote procedure calls or the like.

Each database index 411–413 represents an ordering of records in database 410 according to some specified criterion. In the preferred embodiment, an index is itself a collection of records, in which there is generally one index record for each record in database 410, although some indexes may cover only a subset of the records. An index record comprises a key value, a pointer to a corresponding record in database 410, and additional fields necessary for maintaining the index. The key value represents a value derived from the corresponding record in accordance with the specified ordering criterion for the database index. This ordering criterion may be something so simple as a value taken directly from one of the fields of the records in database 410, or it may be a value which is derived according to some formula from one or more fields in database 410 and/or from data external to database 410.

Records in a database index are sorted according to the ordering criterion for the database index, i.e., according to the key value field of the database index record. Any of various known data structures may be used for maintaining this ordering relationship. For example, the index records may be kept in a singly or doubly linked list, in a binary tree, or any other suitable structure.

Although database indexes 411–413 are sometimes referred to as "index objects" or "objects", the use of the term "object" is not meant to imply that database management system 401, protection utility 402, or the user applications are necessarily programmed using so-called object-oriented programming techniques, or that the "index object" necessarily has the attributes of an object in an object-oriented programming environment, although it would be possible to implement them using object-oriented programming constructs.

As will be appreciated, database indexes 411–413 may be subject to frequent changes, and may exhibit more change activity than database 410 itself. For example, if the value of a single field in database 410 is altered, this field could affect the multiple key values which define ordering relationships in multiple indexes. For each affected index, not only does the index record key value field change, but the index record with a new key value may require resorting, meaning that multiple records must be read to determine the new sorting order, then pointer fields in various records must be updated in accordance with the new order, etc.

Protection utility 402, also known as system managed object protection, provides protection services for compiled data, and specifically in the preferred embodiment, provides protection services for database indexes 411–413. In general, protection utility 402 takes a compromised approach between maximum performance and minimum recovery time in the event of a failure, wherein a user may specify the maximum recovery time which can be tolerated, and protection utility 402 manages the logging of indexes so that this maximum recovery time is not exceeded, yet unnecessary logging is not performed. Such a protection utility in a system without logical partitioning is described in U.S. Pat. No. 5,574,897 to Hermsmeier et al. and U.S. Pat. No. 5,625,820 to Hermsmeier at al., both of which are herein incorporated by reference. Additional background information can be found in these patents. Protection utility 402 of the preferred embodiment provides database index protection services in a dynamic logically partitioned environment.

Protection utility 402 estimates a rebuild time for each database index object, i.e., a time required to rebuild the index following a failure. It automatically determines an internal rebuild time threshold by an iterative process which determines total recovery time for an assumed internal rebuild time, and adjusts the internal rebuild time to converge on a total recovery time limit specified by the user. In general, indexes having a rebuild time in excess of the internal threshold are logged to reduce the length of recovery time. Those having a rebuild time less than the threshold are not logged. Thus, the protection utility 402 tends to log the indexes which would take a longer time to rebuild.

Utility 402 maintains tuning tables 403 to determine actions. One tuning table is maintained for the logical partition as a whole, while additional tuning tables may optionally be maintained for user-defined auxiliary storage pools (ASPs), which are areas of storage designated by the user for a specific application or group of applications. In addition to a recovery time limit for the partition as a whole, the user may define a separate recovery time limit for each ASP, and thus have a shorter recovery time limit for more critical applications, and longer time limits for less critical applications. Utility 402 manages index logging so that all recovery time limits thus defined are met.

Figure 5:
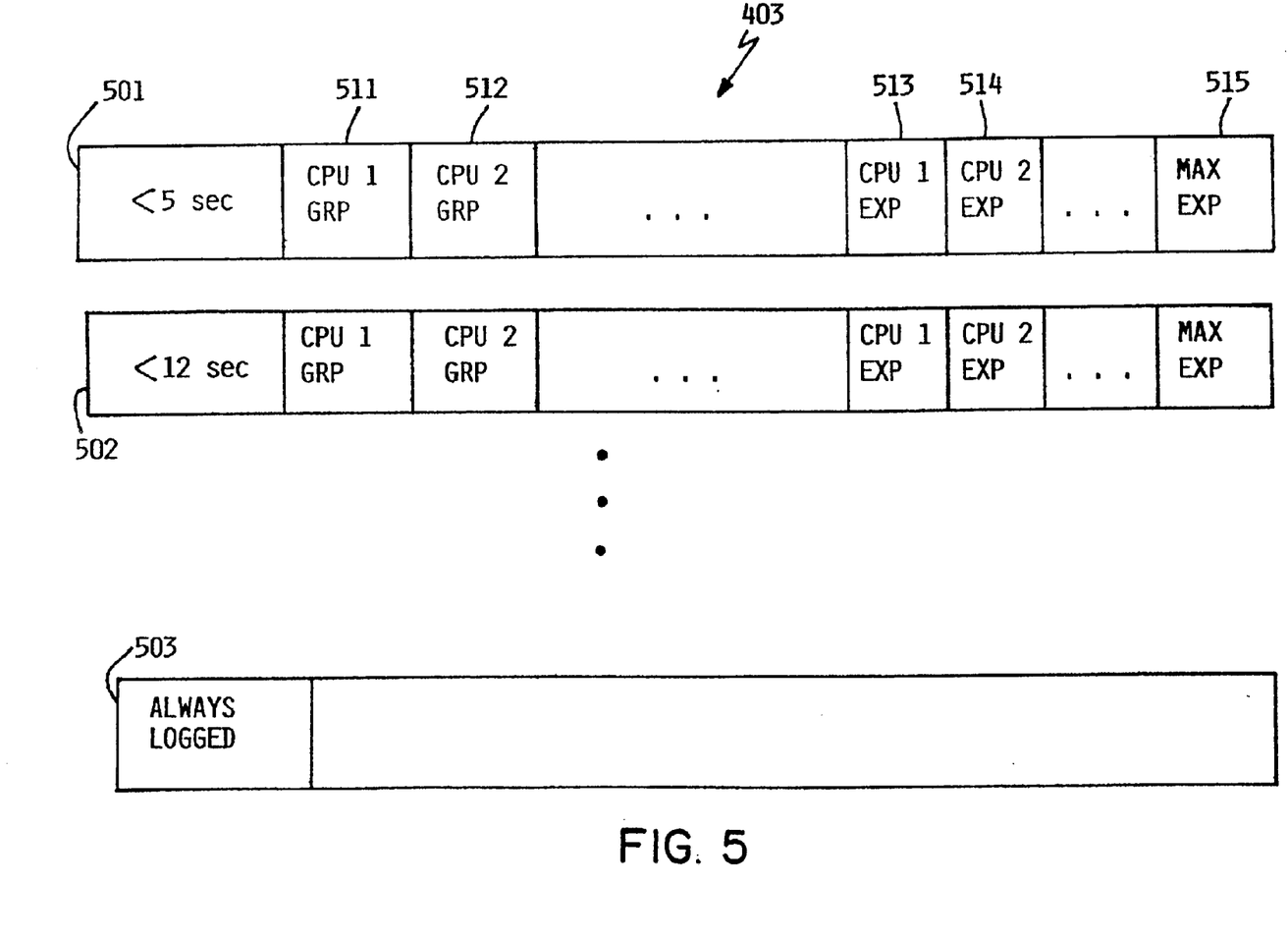
FIG. 5 is a logical view of a tuning table used to manage database index logging, according to the preferred embodiment.

FIG. 5 is a logical view of a tuning table 403 used to manage index object logging. A tuning table contains multiple collections of database indexes 501–503, each collection referred to as a "bucket". The word "bucket" is used to signify a collection having no particular ordering. Each bucket 501–502 contains database indexes having rebuild times within a given range. One special bucket 503 contains indexes which are to be logged regardless of rebuild time. For example, bucket 501 contains indexes having a rebuild time less than 5 seconds, bucket 502 contains indexes having a rebuild time between 5 and 12 seconds, and so on, the range of rebuild time increasing with each successive bucket. Each bucket 501–502 contains multiple sub-buckets or groups 511–512, each sub-bucket corresponding to a single CPU allocated to the logical partition in which utility 402 executes. Each sub-bucket contains a subset of the database indexes in the bucket, which has been assigned to a given CPU for tuning calculation purposes. Although an index is put in one sub-bucket for purposes of estimating rebuild times, that index could in fact be rebuilt by a different CPU. The bucket further contains an array of rebuild times 513–514, one corresponding to each CPU. These times represent the cumulative rebuild time of all indexes in the sub-bucket 511–512 of the corresponding CPU, and of all indexes in the lower-level sub-buckets of the same CPU, i.e., in all the sub-buckets of the same CPU which are contained in a bucket having a lower rebuild time. The bucket further contains a maximum rebuild time value 515, which is simply the largest value among the array of rebuild times 513–514. FIG. 5 is stated herein as a logical view of the tuning table, it being understood that in implementation a tuning table may utilize any of various data structures which may or may not occupy contiguous storage, such as an arrays, pointers, lists, etc.

Where a logical partition is assigned a set of dedicated CPUs, the number of sub-buckets 511–512 and number of rebuild times 513–514 in each bucket 501–502 of tuning table 403 is the same as the number of dedicated CPUs assigned to the partition, one corresponding to each dedicated CPU. Where a logical partition shares a pool of CPUs and has an assigned processor capacity, the number of sub-buckets 511–512 and number of rebuild times 513–514 in each bucket 501–502 is the assigned processor capacity, rounded to the nearest integer (but never less than 1).

In the preferred embodiment, the rebuild time values 513–514 are computed in the manner described for computing exposure times for non-partitioned system having a fixed set of CPUs in the above mentioned Hermsmeier patents (U.S. Pat. Nos. 5,574,897 and 5,625,820). In this computation, fractional CPU resources in a logical partition are rounded to the nearest integer. E.g., if a partition P is assigned 3.6 processor resource units from a shared processor pool, it has 4 sub-buckets 511–512 in its tuning table entries, and rebuild time is computed as it if had 4 CPUs, but if the partition is assigned 3.4 processor resource units, it has only 3 sub-buckets 511–512 in its tuning table entries. It will always have at least one sub-bucket, even if the assigned processor resource is less 0.5 processor resource units. This is obviously a simplification, and in the case of processor resource less than 1 unit, could cause a considerable discrepancy between estimated time and actual recovery time. However, it is unusual to assign such small processor resource amounts to a partition used for databases. If additional accuracy is desired, it would alternatively be possible to account for fractional processing resources of a shared pool by using an appropriate scaling factor for the computed rebuild times. I.e., for a partition having 3.6 processing units, the computed rebuild times of each processor could be multiplied by a scaling factor of (4/3.6), or approximately 1.11.

Furthermore, any of various alternative methods could be used to allocate index objects to CPU sub-buckets. For example, a possibly more aggressive (although more computationally intensive) estimate could be made by re-allocating indexes from scratch with each bucket, assigning the indexes having the longest rebuild times first. In this alternative approach, the rebuild time calculation for bucket N would ignore the calculation of all lower level buckets, and begin by assigning each index in bucket N to a CPU, starting with the largest rebuild time, and when all indexes in bucket N are assigned, continuing to bucket (N−1), and so on until all index objects in the lower level buckets are assigned.

Figure 6:
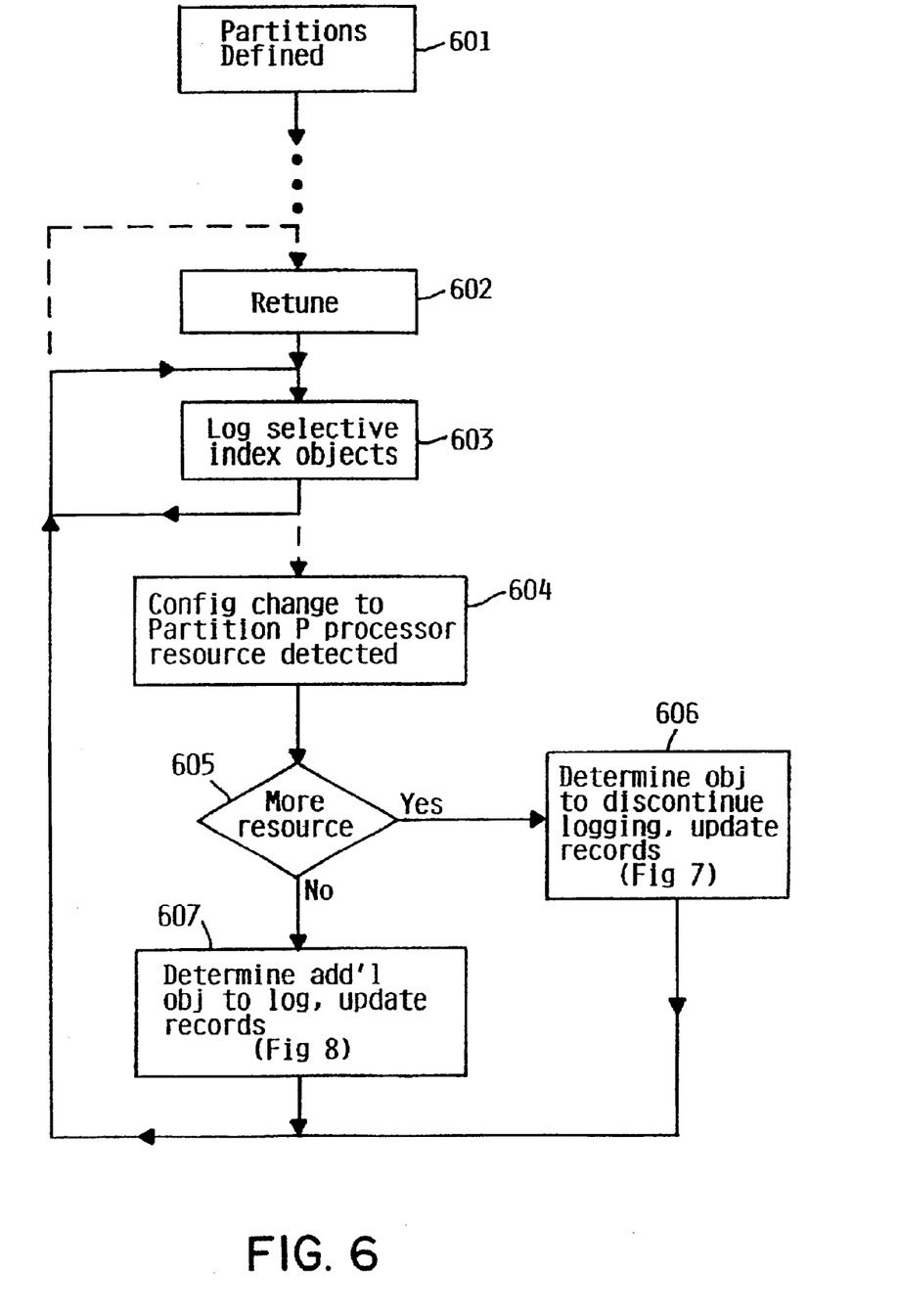
FIG. 6 is a high-level flow diagram of the overall process of managing the selective logging of objects in a logically partitioned environment, according to the preferred embodiment.

FIG. 6 is a high-level flow diagram of the overall process of managing the selective logging of objects in a logically partitioned environment. Although not directly part of the selective logging process, initially a plurality of logical partitions and their resources is defined (block 601), in which at least one of the partitions (herein partition P) contains database management system 401, protection utility 402, database 410, and database indexes 411–413, as shown in FIG. 4. This definition is generally performed by a system administrator interacting with hypervisor code executing in the primary partition. The remaining steps of FIG. 6, as well as steps shown in FIGS. 7 and 8, are performed in partition P.

Sometime after establishing the partition definition, and particularly the definition of partition P, database management system manages database 410, and protection utility 402 manages selective logging of database index objects. Protection utility 402 establishes supporting data structures, including in particular tuning table 403, from which it periodically retunes the selective logging strategy (block 602). Between retuning, utility 402 manages the selective logging of objects in a continuous process, in accordance with the selection criteria determined in the most recent tuning (block 603). This is represent in FIG. 6 by the tight loop around block 603, and the dashed line to block 602 indicating periodic retuning.

At some point, a dynamic configuration change affecting the processor resources assigned to partition P may occur, of which protection utility 402 is made aware (block 604). In the preferred embodiment, the operating system generates an alert message of a change, and utility 402 can determine the character of the change by examining a configuration record, although other procedures could alternatively be used. If the effect of the change is to add processing resource to partition P, the "Y" branch from block 605 is taken. In this case, the utility determines a set of index objects which need no longer be logged and updates appropriate records; the process of doing so is represented at a high level by block 606, and shown in greater detail in FIG. 7. If, at block 605, the effect of the change is to reduce processing resource of partition P, the "N" branch is taken. In this case, the utility determines a set of additional index objects to be logged, and updates appropriate records; the process of doing so is represented at a high level by block 607, and shown in greater detail in FIG. 8. In either case, the utility then continues to log objects in accordance with the new selection criteria, represented as a return to block 603.

Figure 7:
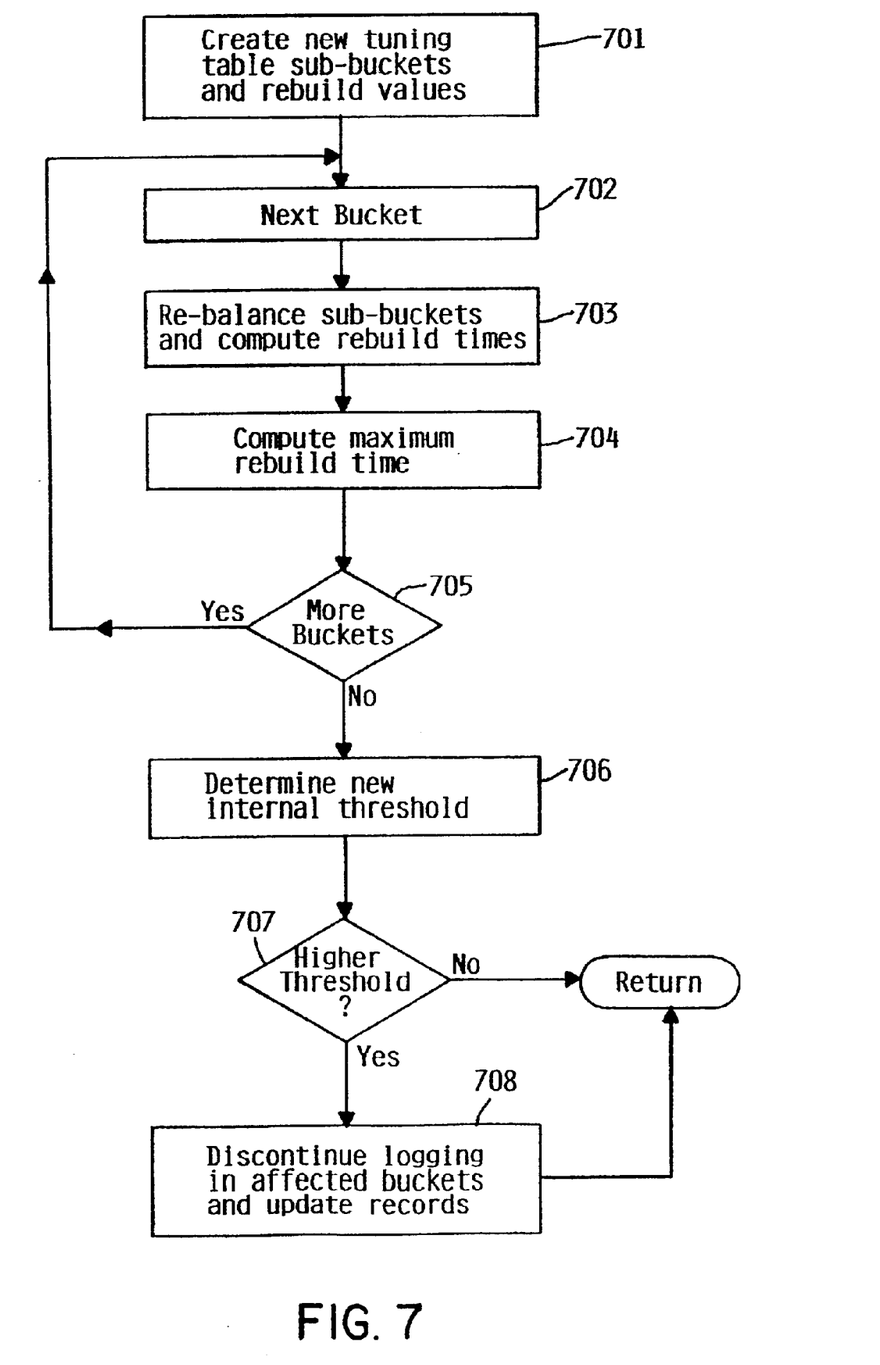
FIG. 7 is a flow diagram showing in greater detail the action taken to reduce logging when processor resource has increased, according to the preferred embodiment.
Figure 8:
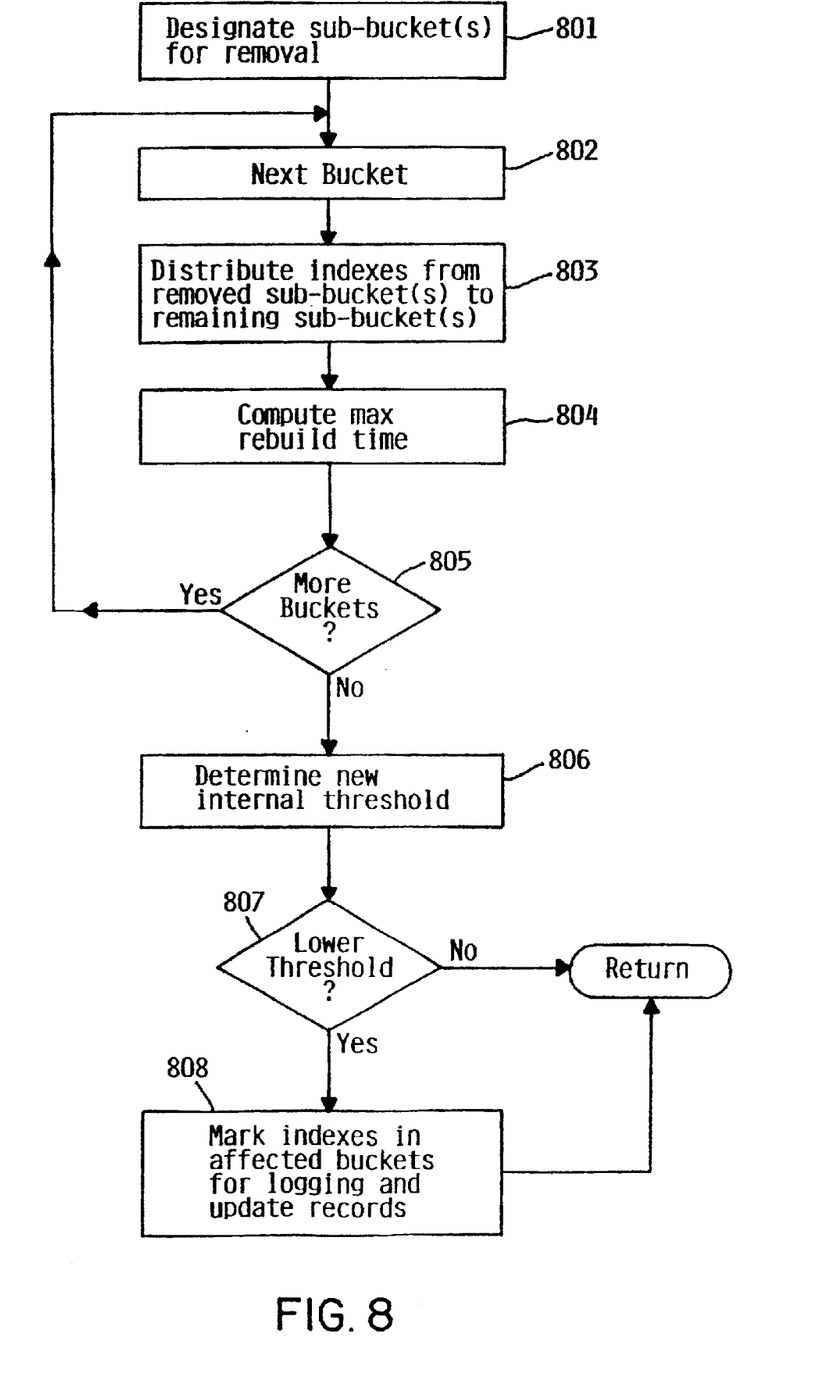
FIG. 8 is a flow diagram showing in greater detail the action taken to log additional index objects when processor resource has been reduced, according to the preferred embodiment.

FIG. 7 is a flow diagram showing in greater detail the action taken to reduce logging when processor resource has increased. Initially, an additional CPU sub-bucket(s) 511–512 is allocated to tuning table 403, and an additional corresponding rebuild time value(s) 513–514 is added, to account for the additional CPU(s) added as processor resource to partition P (block 701). By "added", it is understood that each bucket in tuning table 403 is allocated the additional sub-bucket(s) and rebuild time value(s)

Beginning with the lowest level bucket and continuing in order to the highest level bucket, protection utility 402 then successively chooses a bucket to balance (block 702), re-allocates the index objects in the sub-buckets (block 703), and computes a new maximum cumulative rebuild time value 515 (block 704). The re-allocation process at block 703 is accomplished as follows. The utility chooses an existing sub-buckets having the highest cumulative rebuild time and a new sub-bucket having the lowest cumulative rebuild time. It then chooses an index object from the existing sub-bucket for transfer to the new sub-bucket. If the chosen index object has a rebuild time less than the difference in cumulative rebuild times of the two sub-buckets, it is transferred to the new sub-bucket. The utility then chooses another pair of sub-buckets. This process continues until the utility chooses a pair of sub-buckets for which the difference in rebuild times is less than or equal to that of the index object, at which point the sub-buckets are reasonably well balanced, and the balancing stops. It will be observed that, using this procedure, each index object can be moved only once, and therefore there is a minimal amount of movement of the index objects. It would alternatively be possible to re-balance all the sub-buckets from scratch, but such an alternative would entail greater overhead.

When all buckets have been thus balanced, the "N" branch is taken from block 705. The utility then determines the new internal time threshold from the revised tuning table 403, and specifically, using the revised cumulative rebuild values 515 (block 706). I.e., the new internal time threshold is the index object rebuild time of the highest level bucket whose cumulative rebuild time value 515 is less than the user-specified ("external") recovery time limit. A small adjustment is made to the user-specified recovery time limit, to account for relatively small amount of time required to recover logged index objects from the log. Typically, the threshold will be higher, in which case the "Y" branch is taken from block 707. A higher threshold means that one or more buckets which were previously above the threshold, and required logging, are now below the threshold because the index objects within those buckets can be rebuilt within the user-specified cumulative time limit using the previously existing and additional processor resource. In this case, the index objects within these buckets are no longer logged. I.e., due to updates in the tuning table and associated records, these objects will not be logged as future changes are made (block 708). However, log entries are not erased, and so there will be some time lag before all these objects are actually in an exposed state, requiring rebuilding. During this time lag, any objects which have not been changed could still be recovered from the log.

FIG. 8 is a flow diagram showing in greater detail the action taken to log additional index objects when processor resource has been reduced. Initially, an one or more CPU sub-bucket(s) 511–512 of tuning table 403 are designated for removal, along with the associated rebuild time value(s) 513–514 (block 801). These sub-buckets correspond to the amount of processor resource removed from partition P.

Beginning with the lowest level bucket and continuing in order to the highest level bucket, utility 402 then successively chooses a bucket to balance (block 802), distributes the index objects from the sub-buckets being removed to the remaining sub-buckets (block 803), and computes a new maximum cumulative rebuild time value 515 (block 804). The process of distributing index objects at block 803 is accomplished as follows. The utility in turn chooses the index object having the highest rebuild time from the sub-bucket(s) to be removed, and places it in the sub-bucket which has the lowest cumulative rebuild time of all the remaining sub-buckets. When all index objects from the sub-bucket(s) to be removed have been thus allocated, the task is finished. As in the case of the process of FIG. 7, each index object can be moved only once; it would alternatively be possible to re-balance all the remaining sub-buckets from scratch, but such an alternative would entail greater overhead.

When all buckets have been thus balanced, the "N" branch is taken from block 805. The utility then determines the new internal time threshold from the revised tuning table 403, i.e., the table after removing selective sub-buckets (block 806). The new internal time threshold is the index object rebuild time of the highest level bucket whose cumulative rebuild time value 515 is less than the user-specified ("external") recovery time limit. A small adjustment is made to the user-specified recovery time limit, to account for relatively small amount of time required to recover logged index objects from the log. Typically, the threshold will be lower, in which case the "Y" branch is taken from block 807. A lower threshold means that one or more buckets which were previously below the threshold, and for which no index object logging was required, are now above the threshold because the index objects within those buckets can not be rebuilt within the user-specified cumulative time limit. As a result, the index objects in these buckets must now be logged. The tuning table and associated records are updated to reflect that these index objects should be logged (block 808). In the preferred embodiment, the affected index objects are not necessarily logged immediately. Instead, only the various records which govern logging selection are changed, so that when the affected index objects are next updated, they will automatically be logged. This will typically mean that there is a time lag during which some of the affected objects are not logged, and if the system were to fail during this time lag, recovery time may exceed the user-specified limit. However, this gradual migration to a state wherein all affected objects are logged is deemed preferable to immediate logging because it is less disruptive to system operations.

Where the user has specified multiple ASPs, the above process must be followed separately for each tuning table in each ASP to assure that all applicable ASP recovery time limits can be met. As described above, the recovery time limits are user specified, but it will be understood that such time limits could alternatively be assumed by system-wide default, or could be implied by the nature of the data or some other mechanism.

In the above description, a single protection utility and associated set of tuning tables is described in a single logical partition of a computer system having multiple logical partitions. It will be understood that each logical partition functions as an independent computer system, and therefore there could be multiple protection utilities executing simultaneously in multiple different logical partitions, each selectively logging respective sets of indexes in its own partition, and further that some partitions may contain no databases and/or no protection utilities, and further, that some partitions may use different operating systems, wherein any databases and associated protection utilities, if they exist, may operate on different principles.

A particular set of logical partition parameters has been described in the preferred embodiment, and a particular parameter (i.e., processing capacity) used by the protection utility to determine recovery times. However, it will be appreciated that a logically partitioned computer system could use other configuration parameters; that other parameters (including parameters described herein as well as those not described) may affect a recovery time determination and/or logging strategy; and that a protection utility could use these other parameters in addition to or in place of the parameters described herein.

In general, the routines executed to implement the illustrated embodiments of the invention, whether implemented as part of an operating system or a specific application, program, object, module or sequence of instructions may be referred to herein as "computer programs" or simply "program". The computer programs typically comprise instructions which, when read and executed by one or more processors in the devices or systems in a computer system consistent with the invention, cause those devices or systems to perform the steps necessary to execute steps or generate elements embodying the various aspects of the present invention. Moreover, while the invention has and hereinafter will be described in the context of fully functioning computer systems, the various embodiments of the invention are capable of being distributed as a program product in a variety of forms, and the invention applies equally regardless of the particular type of signal-bearing media used to actually carry out the distribution. Examples of signal-bearing media include, but are not limited to, recordable type media such as volatile and non-volatile memory devices, floppy disks, hard-disk drives, CD-ROM's, DVD's, magnetic tape, and transmission-type media such as digital and analog communications links, including wireless communications links. Examples of signal-bearing media are illustrated in FIG. 1 as main memory 102 and as storage devices attached to storage IOPs 111, 112 and 116.

In the preferred embodiment described above, database indexes are selectively logged to meet the specified recovery times. However, the present invention is not necessarily limited to database indexes, and could be applied to other forms of compiled data. Furthermore, while logging has been chosen as an appropriate form of storing selective data in an available form, it will be understood that other forms of storing data which do not require rebuilding could be used. For example, it would alternatively be possible to update all affected records directly on the storage devices.

In the preferred embodiment described above, the computer system utilizes an IBM AS/400 or I/Series architecture. It will be understood that certain implementation details above described are specific to this architecture, and that logical partitioning management mechanisms in accordance with the present invention may be implemented on different architectures, and certain implementation details may vary.

While the invention has been described in connection with what is currently considered the most practical and preferred embodiments, it is to be understood that the invention is not limited to the disclosed embodiments, but on the contrary, is intended to cover various modifications and equivalent arrangements included within the spirit and scope of the appended claims.

What is claimed is:

1. A method for managing the availability of compiled data in a logically partitioned computer system having a plurality of processors, comprising the steps of:

defining a plurality of logical partitions of said computer system, each logical partition having a respective processor resource assignment, wherein each task executing in said computer system is assigned to a respective one of said logical partitions and wherein the definition of a plurality of logical partitions may be dynamically altered;

automatically determining first and second discrete subsets of said compiled data within a first logical partition, wherein said first discrete subset of said compiled data can be rebuilt using a first set of resources assigned to said first logical partition within at least one predetermined recovery time limit;

automatically storing said second subset of said compiled data in a form which does not require rebuilding of said second subset;

automatically detecting a configuration change to said first logical partition which alters the processor resource assignment of said first logical partition;

automatically determining third and fourth discrete subsets of said compiled data within said first logical partition, wherein said third discrete subset of said compiled data can be rebuilt using a second set of resources assigned to said first logical partition within said at least one predetermined recovery time limit, said second set of resources being the set of resources assigned to said first logical partition after said configuration change, said second set of resources being different from said first set of resources; and thereafter automatically storing said fourth subset of compiled data in a form which does not require rebuilding of said fourth subset.

2. The method for managing the availability of compiled data of claim 1, wherein said compiled data comprises a plurality of database indexes.

3. The method for managing the availability of compiled data of claim 1, wherein said predetermined recovery time limit is a user specified recovery time limit.

4. The method for managing the availability of compiled data of claim 1, wherein said step of automatically storing said second subset of compiled data comprises logging changes to said second subset of compiled data in at least one non-volatile storage device, and wherein said step of automatically storing said fourth subset of compiled data comprises logging changes to said fourth subset of compiled data in at least one non-volatile storage device.

5. The method for managing the availability of compiled data of claim 1, wherein:

if said step of automatically detecting a configuration change to said first logical partition detects a configuration change which increases the processor resource assignment of said first logical partition, then said step of automatically determining third and fourth discrete subsets determines a fourth subset which is a subset of said second subset; and if said step of automatically detecting a configuration change to said first logical partition detects a configuration change which reduces the processor resource assignment of said first logical partition, then said step of automatically determining third and fourth discrete subsets determines a third subset which is a subset of said first subset.

6. The method for managing the availability of compiled data of claim 1, wherein said step of automatically determining first and second discrete subsets of said compiled data comprises defining a plurality of buckets for said compiled data, each bucket corresponding to a respective rebuild time; determining a respective cumulative rebuild time for each bucket, said cumulative rebuild time representing the rebuild time using said first set of resources of all compiled data in the respective bucket and in all buckets corresponding to smaller rebuild times; and selecting the compiled data in all buckets having cumulative rebuild times less than said predetermined recovery time limit for inclusion in said first discrete subset; and wherein said step of automatically determining third and fourth discrete subsets of said compiled data comprises determining a respective cumulative rebuild time for each bucket, said cumulative rebuild time representing the rebuild time using said second set of resources of all compiled data in the respective bucket and in all buckets corresponding to smaller rebuild times; and selecting the compiled data in all buckets having cumulative rebuild times less than said predetermined recovery time limit for inclusion in said third discrete subset.

7. The method for managing the availability of compiled data of claim 6, wherein each said bucket comprises at least one sub-bucket, each sub-bucket corresponding to a processor resource;

wherein if said second set of resources is greater than first set, then said step of automatically determining third and fourth discrete subsets comprises allocating additional sub-buckets corresponding to the difference between said first set of resources and said second set of resources, and transferring compiled data units from previously existing sub-buckets to said additional sub-buckets; and wherein if said second set of resources is less than said first set, then said step of automatically determining third and fourth discrete subsets comprises removing sub-buckets corresponding the difference between said first set of resources and said second set of resources, and transferring compiled data units from the removed sub-buckets to remaining sub-buckets.

8. A program product for managing the availability of compiled data in a computer system having a plurality of central processors and a dynamic logical partitioning mechanism, said dynamic logical partitioning mechanism supporting a plurality of defined logical partitions of said computer system, each logical partition having a respective processor resource assignment, wherein each task executing in said computer system is assigned to a respective one of said logical partitions and wherein the definition of a plurality of logical partitions may be dynamically altered, said program product comprising a plurality of processor executable instructions recorded on computer readable media, wherein said instructions, when executed by at least one central processor of said computer system, cause the system to perform the steps of:

automatically determining first and second discrete subsets of said compiled data within a first logical partition, wherein said first discrete subset of said compiled data can be rebuilt using a first set of resources assigned to said first logical partition within at least one predetermined recovery time limit;

automatically storing said second subset of said compiled data in a form which does not require rebuilding of said second subset;

automatically detecting a configuration change to said first logical partition which alters the processor resource assignment of said first logical partition;

automatically determining third and fourth discrete subsets of said compiled data within said first logical partition, wherein said third discrete subset of said compiled data can be rebuilt using a second set of resources assigned to said first logical partition within said at least one predetermined recovery time limit, said second set of resources being the set of resources assigned to said first logical partition after said configuration change, said second set of resources being different from said first set of resources; and thereafter automatically storing said fourth subset of compiled data in a form which does not require rebuilding of said fourth subset.

9. The program product for managing the availability of compiled data of claim 8, wherein said compiled data comprises a plurality of database indexes.

10. The program product for managing the availability of compiled data of claim 8, wherein said predetermined recovery time limit is a user specified recovery time limit.

11. The program product for managing the availability of compiled data of claim 8, wherein said step of automatically storing said second subset of compiled data comprises logging changes to said second subset of compiled data in at least one non-volatile storage device, and wherein said step of automatically storing said fourth subset of compiled data comprises logging changes to said fourth subset of compiled data in at least one non-volatile storage device.

12. The program product for managing the availability of compiled data of claim 8, wherein:

if said step of automatically detecting a configuration change to said first logical partition detects a configuration change which increases the processor resource assignment of said first logical partition, then said step of automatically determining third and fourth discrete subsets determines a fourth subset which is a subset of said second subset; and if said step of automatically detecting a configuration change to said first logical partition detects a configuration change which reduces the processor resource assignment of said first logical partition, then said step of automatically determining third and fourth discrete subsets determines a third subset which is a subset of said first subset.

13. The program product for managing the availability of compiled data of claim 8, wherein said step of automatically determining first and second discrete subsets of said compiled data comprises defining a plurality of buckets for said compiled data, each bucket corresponding to a respective rebuild time; determining a respective cumulative rebuild time for each bucket, said cumulative rebuild time representing the rebuild time using said first set of resources of all compiled data in the respective bucket and in all buckets corresponding to smaller rebuild times; and selecting the compiled data in all buckets having cumulative rebuild times less than said predetermined recovery time limit for inclusion in said first discrete subset; and wherein said step of automatically determining third and fourth discrete subsets of said compiled data comprises determining a respective cumulative rebuild time for each bucket, said cumulative rebuild time representing the rebuild time using said second set of resources of all compiled data in the respective bucket and in all buckets corresponding to smaller rebuild times; and selecting the compiled data in all buckets having cumulative rebuild times less than said predetermined recovery time limit for inclusion in said third discrete subset.

14. The program product for managing the availability of compiled data of claim 13, wherein each said bucket comprises at least one sub-bucket, each sub-bucket corresponding to a processor resource;

wherein if said second set of resources is greater than first set, then said step of automatically determining third and fourth discrete subsets comprises allocating additional sub-buckets corresponding to the difference between said first set of resources and said second set of resources, and transferring compiled data units from previously existing sub-buckets to said additional sub-buckets; and wherein if said second set of resources is less than said first set, then said step of automatically determining third and fourth discrete subsets comprises removing sub-buckets corresponding the difference between said first set of resources and said second set of resources, and transferring compiled data units from the removed sub-buckets to remaining sub-buckets.

15. A computer system, comprising:

a plurality of central processing units;

a memory;

a logical partitioning mechanism supporting a plurality of defined logical partitions of said computer system, each logical partition having a respective processor resource assignment, wherein each task executing in said computer system is assigned to a respective one of said logical partitions and wherein the definition of said logical partitions may be dynamically altered;

a protection utility for compiled data in a first logical partition of said computer system, wherein said protection utility:

(a) automatically computes rebuild times of discrete portions of said compiled data according to a first configuration of said first logical partition to determine a first subset of said compiled data to be stored in a form which does not require rebuilding, said first subset being determined to meet a predetermined recovery time limit;

(b) automatically detects a configuration change to said first logical partition which affects the time required to rebuild said compiled data, said configuration change configuring said first logical partition according to a second configuration;

(c) responsive to detecting said configuration change, computes rebuild times of said discrete portions of said compiled data according to said second configuration of said first logical partition; and (d) automatically determines a second subset of said compiled data to be stored in a form which does not require rebuilding using said rebuild times of said discrete portions of said compiled data according to said second configuration of said first logical partition, said second subset being determined to meet said predetermined recovery time; and (e) automatically migrates compiled data stored in said form which does not require rebuilding from said first subset to said second subset.

16. The computer system of claim 15, wherein said compiled data comprises a plurality of database indexes.

17. The computer system of claim 15, wherein said form which does not require rebuilding comprises one or more log records stored in a non-volatile storage device.

\* \* \* \* \*